(12) United States Patent
Hirschmanner

(10) Patent No.: US 7,748,220 B2
(45) Date of Patent: Jul. 6, 2010

(54) METHOD AND DEVICE FOR CONVERTING HEAT INTO MECHANICAL WORK

(76) Inventor: Rudolf Hirschmanner, Schmiedgasse 11, A-8605 Kapfenberg (AT)

( * ) Notice: Subject to any disclaimer, the term of this patent is extended or adjusted under 35 U.S.C. 154(b) by 0 days.

(21) Appl. No.: 10/584,759

(22) PCT Filed: Nov. 18, 2004

(86) PCT No.: PCT/AT2004/000405

§ 371 (c)(1),
(2), (4) Date: Jul. 21, 2006

(87) PCT Pub. No.: WO2005/049973

PCT Pub. Date: Jun. 2, 2005

(65) Prior Publication Data

US 2006/0277909 A1 Dec. 14, 2006

(30) Foreign Application Priority Data

Nov. 20, 2003 (AT) ............................. A 1865/2003

(51) Int. Cl.
*F01K 13/00* (2006.01)
(52) U.S. Cl. .......................................... 60/645; 60/517
(58) Field of Classification Search ................ 60/39.01, 60/643, 645, 517
See application file for complete search history.

(56) References Cited

U.S. PATENT DOCUMENTS

| | | | | |
|---|---|---|---|---|
| 3,956,899 A | * | 5/1976 | Kronogard | .................... 60/682 |
| 4,004,426 A | * | 1/1977 | Laing | ........................... 60/659 |
| 4,019,325 A | | 4/1977 | Murphy, Jr. | |
| 4,044,562 A | | 8/1977 | England | |
| 4,442,677 A | * | 4/1984 | Kauffman | ..................... 60/673 |
| 4,781,241 A | * | 11/1988 | Misage et al. | ............... 165/140 |
| 5,274,997 A | * | 1/1994 | Inoue et al. | .............. 60/39.511 |
| 6,491,141 B1 | * | 12/2002 | Severinsson | ................ 188/170 |

FOREIGN PATENT DOCUMENTS

DE 38 07 783 A1 11/1989
DE 38 12 928 A1 11/1989

* cited by examiner

*Primary Examiner*—Hoang M Nguyen
(74) *Attorney, Agent, or Firm*—Laurence A. Greenberg; Werner H. Stemer; Ralph E. Locher

(57) ABSTRACT

A novel method converts heat into mechanical work. In a cyclic process, a working medium is compressed while giving off heat and it is subsequently brought in thermal contact with the surroundings via a first heat exchanger. Then it is expanded while obtaining mechanical work, whereupon the cyclic process is run through once more. A high degree of efficiency is achieved by virtue of the fact that the working medium, after expansion, is guided through another heat exchanger, which is situated inside a rapidly rotating rotor and which, on the exterior thereof, is surrounded by at least one substantially annular gas space from whose exterior heat is dissipated. There is also disclosed a device for carrying out the novel method.

20 Claims, 4 Drawing Sheets

METHOD AND DEVICE FOR CONVERTING HEAT INTO MECHANICAL WORK

BACKGROUND OF THE INVENTION

1. Field of the Invention

The invention relates to a method for converting heat into mechanical work, in which a working medium is compressed in a cyclic process while giving off heat and is subsequently brought in thermal contact with the ambient environment via a first heat exchanger, is then expanded while obtaining mechanical work, whereupon the cyclic process is run through again.

2. Description of the Related Art

Numerous working methods are known to convert thermal energy into mechanical work. Usually, a working medium is compressed, heated, expanded in the heated state and cooled in such cyclic processes, whereupon the cyclic process starts again. The precondition for such cyclic processes is that two different temperature levels are available which are used for heating or cooling the working medium. Generally, a certain temperature is defined as the ambient temperature, which is the temperature of a medium which is available in an unlimited and gratuitous way. This can be the air temperature of the ambient environment for example or the temperature of a water body from which water can be taken in sufficient quantities for purposes of temperature exchange.

No cyclic processes are known with which it is possible to gain mechanical work from thermal energy without disposing over a heat transfer medium whose temperature differs substantially from ambient temperature. According to current belief such a cyclic process is excluded by the second law of thermodynamics. It is stated in a more precise version of the second law of thermodynamics that the efficiency of any cyclic process for converting thermal energy into mechanical work cannot exceed the so-called Carnot efficiency which is calculated from the ratio of the available temperature levels. Real existing methods and apparatuses are generally also far away from the Carnot efficiency.

Apparatuses for generating temperature differences are known which use gas-dynamic effects occurring at high accelerations in order to produce temperature differences. These apparatuses are not suitable in order to perform cyclic processes for gaining mechanical work.

DE 38 12 928 A shows an apparatus which tries to overcome the above disadvantages. Even with such an apparatus it is not possible to improve the efficiency to a relevant extent.

It is the object of the present invention to provide a method of the kind mentioned above which allows obtaining mechanical work from thermal energy with the highest possible efficiency.

It is a further object of the invention to provide an apparatus with which the method in accordance with the invention can be performed.

SUMMARY OF THE INVENTION

In accordance with the invention, this method is characterized in that the working medium, after expansion, is guided through another heat exchanger which is situated inside a rapidly rotating rotor and which, on the exterior thereof, is surrounded by at least one essentially annular gas chamber from whose exterior heat is dissipated.

The inventor of the present invention has recognized that by including the static gas theory in connection with considering gravity or acceleration acting upon the gas molecules or atoms it is possible to illustrate cyclic processes which have an especially high efficiency. The problematic aspect in this connection is however that the effects caused by gravity are very small, as a result of which technical implementation is very difficult. As a result of the cyclic process in accordance with the invention, the utilization of thermal energy for generating mechanical work can be achieved under economically viable framework conditions. A substantial precondition for the method in accordance with the invention is the achievement of the highest accelerations by a rapidly running rotor, with the achieved acceleration values being chosen as high as possible.

It is especially preferable when the working medium is guided downstream of the rotor through a compressor. The heating caused in the compressor is so low in any case that the working medium cooled in the rotor remains beneath the ambient temperature. This ensures that the working medium takes up ambient heat in the first heat exchanger.

In an especially advantageous embodiment of the method in accordance with the invention it is provided that the working medium is guided in the axial direction through the rotor. The effects of high acceleration in the interior of the rotor on the pressure conditions in the working medium can be eliminated substantially.

The present invention further relates to an apparatus for withdrawing heat at ambient temperatures with a rotor having a heat exchanger which can be flowed through substantially in the axial direction and which is delimited on its outside by a cylindrical wall on the outside of which there is provided at least one substantially annular gas chamber.

This apparatus is characterized in accordance with the invention in such a way that the heat exchanger is provided with a substantially ring-cylindrical configuration and that the gas chamber is subdivided in the radial direction into several ring-cylindrical partial chambers. These partial chambers can have the same dimensioning in the radial direction, but can also be provided with different configurations. Only the described configuration of the rotor allows realizing a cyclic process of the kind mentioned above in a technically and economically viable manner.

It is principally possible that in each of the individual partial chambers the same gas is present. In such a case, the pressure on the outside of a partial chamber is generally higher than the pressure on the inner side of the further partial chamber adjacent to said partial chamber. This means that although the pressure increases from the inside to the outside as a result of centripetal acceleration within the individual partial chambers, this increase is interrupted at the boundaries of the individual partial chambers. This leads to a mechanical loading of the separating walls between the individual partial chambers. This is technically controllable because the resulting pressure force acts towards the outside and the separating walls are not loaded to bulging. Preferably however, different gases are received in the different partial chambers which especially have different critical temperatures and pressures. It can thus be achieved that the pressure load of the separating walls is minimized because in the balanced state substantially the same pressure applies inside and outside. It is also within the scope of the present invention that gas mixtures are used instead of pure gases, which gas mixtures form concentration gradients during the operation of the apparatus.

As a result of the extremely rapid rotation of the rotor, the pressure present in the interior of the rotor differ in the idle state substantially from those in the operating state. In order to minimize the loading of the separating walls and the other components, it is provided in an especially preferred embodiment of the invention that a pressure control device is provided which is in connection with the ring-cylindrical partial chambers in order to set the internal pressure. In an especially preferred manner, the ring-cylindrical partial chambers are separated from each other by thin-walled cylindrical separating walls. Mechanical loads of the individual components can thus be minimized.

BRIEF DESCRIPTION OF THE DRAWINGS

The present invention will be explained below in closer detail by reference to the embodiments shown in the drawings, wherein.

DETAILED DESCRIPTION OF THE PREFERRED EMBODIMENTS

Figure 1:
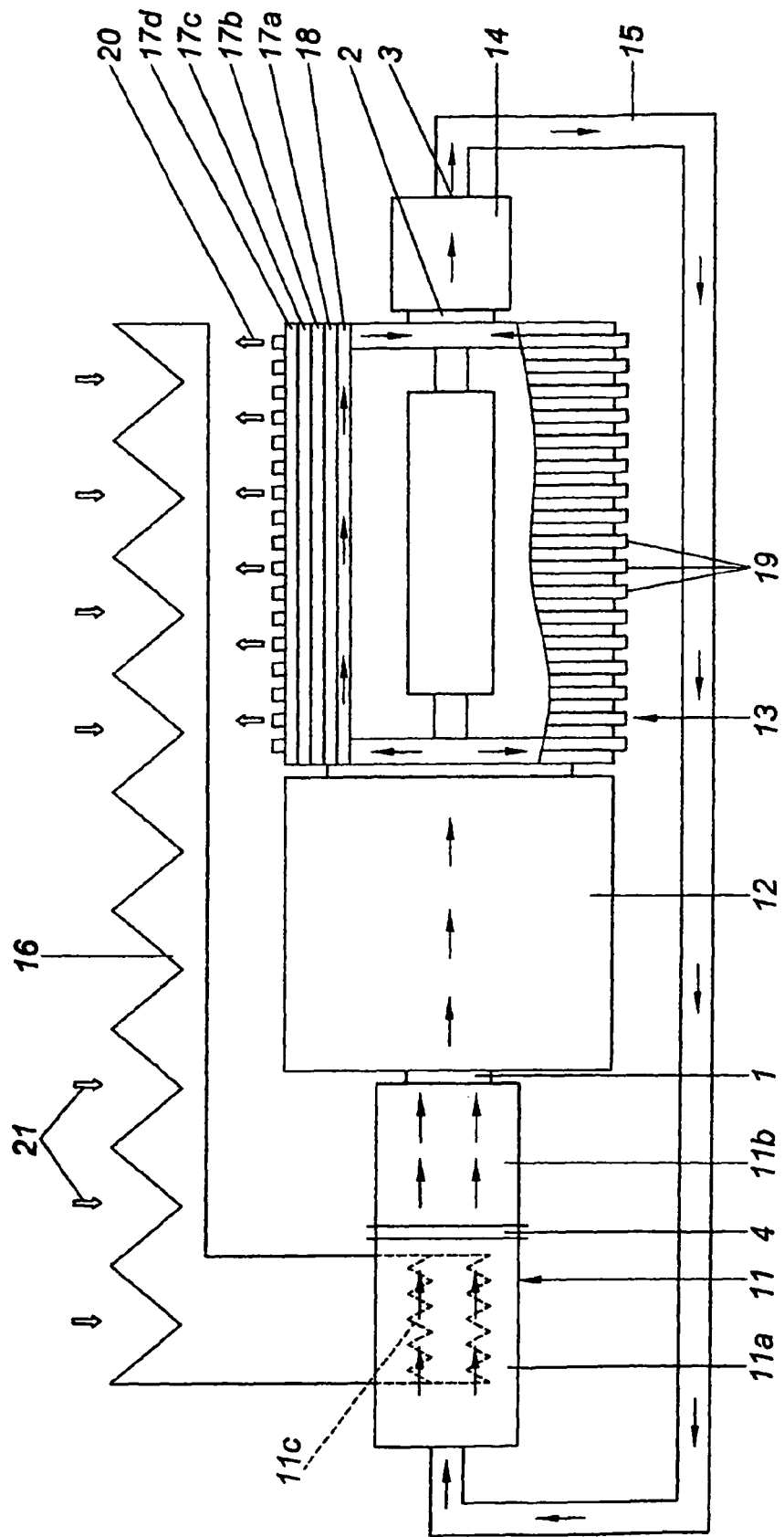
FIG. 1 shows a schematic view of an apparatus for performing the method in accordance with the invention.

The apparatus of FIG. 1 consists of a turbine 11 for the expansion of the working medium, which turbine is divided into two sections 11a, 11b. A heat exchanger 11c is provided in the first section 11a in order to enable an isothermal expansion. It is principally possible to provide several turbine stages in which the working medium is expanded in an adiabatic way and the heat exchangers are provided between the turbine stages, as a result of which only an approximately isothermal expansion is achieved. If the heat exchanger 11c and the turbine 11 are provided themselves, then it is actually possible to achieve a substantial isothermal expansion. The adiabatic expansion occurs in the second section 11b of the turbine 11. The cooling medium is therefore present at the output of the turbine 11 with a temperature which lies beneath the ambient temperature.

A generator 12 is driven by the turbine 11 and a rotor 13 of a centrifuge is simultaneously driven which is flowed through by the working medium in the axial direction. Compression occurs in a compressor 14, whereupon the working medium is guided back to the turbine 11 again via a recirculation line 15.

Rotor 13 comprises a ring-cylindrical heat exchanger 18 and several gas chambers 17a, 17b, 17c, 17d which are also provided with a ring-cylindrical configuration and lie outside of the heat exchanger 18. Notice must be taken that the dimensions of the heat exchanger 18 and the gas chambers 17a, 17b, 17c, 17d in the radial direction are shown on an excessive scale in FIG. 1, because in the case of real configurations these dimensions are very small and the heat exchanger 18 and the gas chambers 17a, 17b, 17c, 17d lie close to the outer jacket of the rotor 13. Rotor 13 is provided on its outer side with cooling ribs 19 which represent a heat exchanger for dissipating heat. This is indicated by arrows 20.

The gas chambers 17a, 17b, 17c, 17d are preferably filled with different gases, with the innermost gas chamber 17a being filled with helium for example, the adjacent gas chamber 17b with xenon, the third gas chamber 17c with nitrogen or a suitable hydrocarbon, and the outermost gas chamber 17d with a suitable coolant. As a result of the rapid rotation of the rotor 13, a temperature drop from the outside to the inside is caused in the gas chambers 17a, 17b, 17c, 17d which strongly cools the working medium in the heat exchanger 17.

Heat at the temperature level of the ambient environment is supplied to the heat exchanger 16, which is indicated by arrow 21. An increase in the efficiency can be achieved when the waste heat of the rotor 13 is also supplied to the heat exchanger 16 according to arrows 20.

Figure 2:
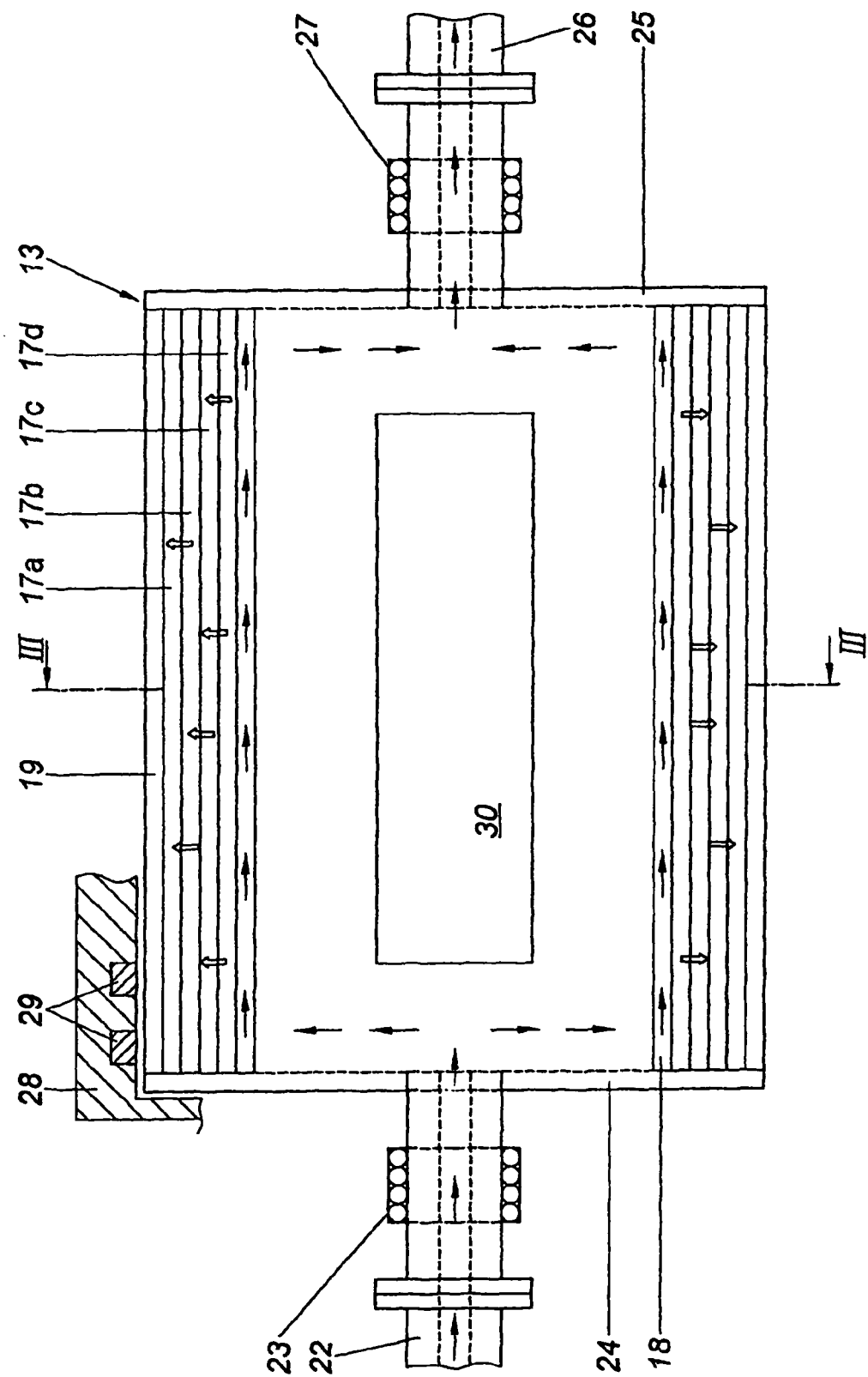
FIG. 2 shows a rotor of the apparatus of FIG. 1 on an enlarged scale.

FIG. 2 shows the rotor 13 in detail in a modified embodiment. The working medium is supplied in the interior of a hollow-bored first shaft 22 which is held in a bearing 23 and is guided via distributor lines 24 to the outside radially to the heat exchanger 18. In the interior of the heat exchanger 18 the working medium flows in the axial direction to the opposite side of rotor 13 in order to be guided in further distributor lines 25 radially to the inside to a further shaft 26 held in a bearing 27. As in the preceding embodiment, the four gas chambers 17a, 17b, 17c, 17d are provided radially inside one another. A heat exchanger 18 is provided on the outside for dissipating heat. A housing 28 is indicated in a schematic manner, in which the rotor is arranged in a rotatable way which comprises a plurality of magnets 29. The magnets 29 are used for relieving the bearings 23 and 27 at high speeds and are in interaction with magnets (not shown) on the outside of rotor 13 itself. The polarity is directed in such a way that the magnets 29 and the magnets on rotor 13 repulse one another, as a result of which an inwardly facing force is exerted on the jacket surface of the rotor 13 which considerably reduces mechanical stress as a result of centrifugal forces and allows higher speeds. At least one gas container 30 is provided in the interior of the rotor 13, which gas container is in connection with one of the gas chambers 17a, 17b, 17c, 17d via lines (not shown). Preferably however, the compensating reservoir 30 comprises sub-containers (not shown) which are individually connected with the individual gas chambers 17a, 17b, 17c, 17d. The mean pressure level in the gas chambers 17a, 17b, 17c, 17d can thus kept at a predetermined value irrespective of the respective speed of the rotor 13, so that mechanical loading of the separating walls between heat exchanger 18 and the gas chambers 17a, 17b, 17c, 17d remains within predetermined limits.

The following tables 1 to 4 show by way of an embodiment the state variables of the gases or gas in the individual gas chambers 17a, 17b, 17c, 17d, with table 1 relating to the innermost gas chamber 17a, table 2 to the gas chamber 17b, table 3 to the gas chamber 17c and table 4 to the gas chamber 17d. The left half of the table indicates the state variables on the outside wall of the respective gas chamber 17a, 17b, 17c, 17d and the right half of the table indicates the respective state variables on the inner wall of the respective gas chamber 17a, 17b, 17c, 17d.

The references mean the following in the tables 1 to 4:

| T | Temperature in K |
|---|---|
| d | Density in kg/m$^3$ |
| p | Pressure in MPa |
| s | Entropy in kJ/kgK |
| u | Inner energy in kJ/kg |
| h | Enthalpy in kJ/kg |

TABLE 1

| T | 276.32 | T | 121.51 |
|---|---|---|---|
| d | 174.43 | d | 28.62 |
| p | 14.33 | p | 0.91 |
| s | 5.18 | s | 5.18 |
| u | 173.15 | u | 81.95 |
| h | 255.33 | h | 114.07 |

TABLE 2

| | | | |
|---|---|---|---|
| T | 424.17 | T | 276.32 |
| d | 129.39 | d | 50.25 |
| p | 17.61 | p | 4.07 |
| s | 5.62 | s | 5.62 |
| u | 294.47 | u | 195.45 |
| h | 430.58 | h | 276.45 |

TABLE 3

| | | | |
|---|---|---|---|
| T | 579.04 | T | 424.17 |
| d | 94.29 | d | 45.76 |
| p | 17.54 | p | 5.88 |
| s | 5.98 | s | 5.98 |
| u | 419.52 | u | 307.62 |
| h | 605.58 | h | 436.27 |

TABLE 4

| | | | |
|---|---|---|---|
| T | 739.98 | T | 579.04 |
| d | 77.64 | d | 42.67 |
| p | 18.39 | p | 7.54 |
| s | 6.24 | s | 6.24 |
| u | 550.60 | u | 426.66 |
| h | 787.48 | h | 604.32 |

Figure 3:
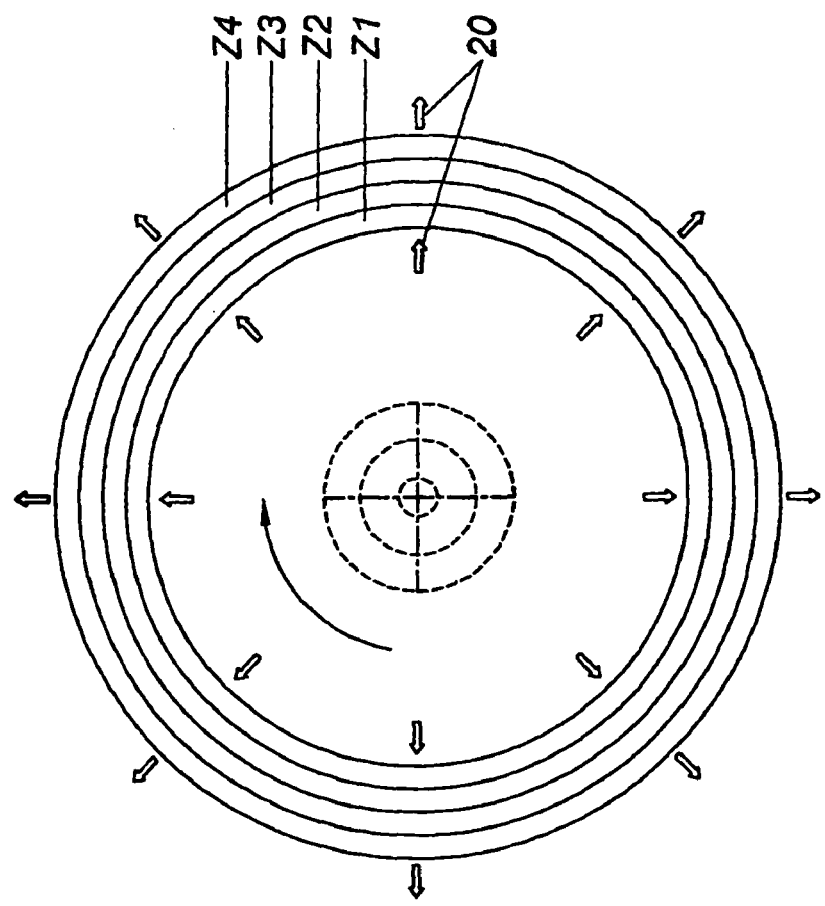
FIG. 3 shows a sectional view along line III-III in FIG. 2.

FIG. 3 schematically shows a sectional view along line III-III in FIG. 2, with the heat exchanger 18 and the cooling ribs 19 having been omitted for improving clarity of the illustration. Arrows 20 symbolize the heat flow.

Figure 4:
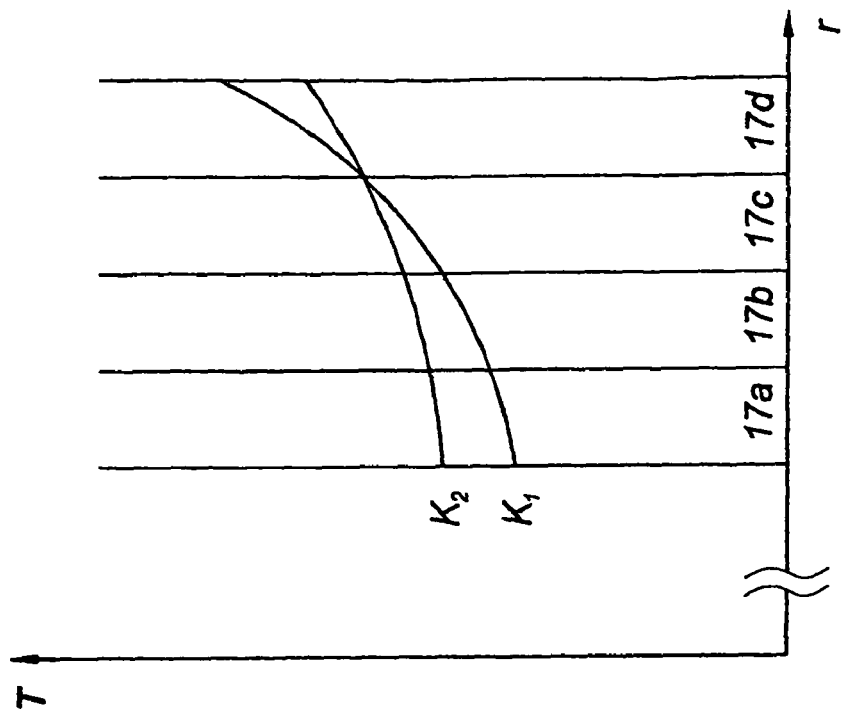
FIG. 4 shows a diagram illustrating the temperature curve in the radial direction of the rotor.

FIG. 4 shows a diagram which schematically states the temperature distribution in the radial direction of the rotor 13 which is stated by r. The curve $K_1$ represents the temperature T in the idle state, i.e. when no heat flow occurs, which is the case when the rotor 13 is insulated on the inside and outside. Curve $K_2$ represents the temperature T in operation, i.e. when there is a heat flow in the radial direction.

Figure 5:
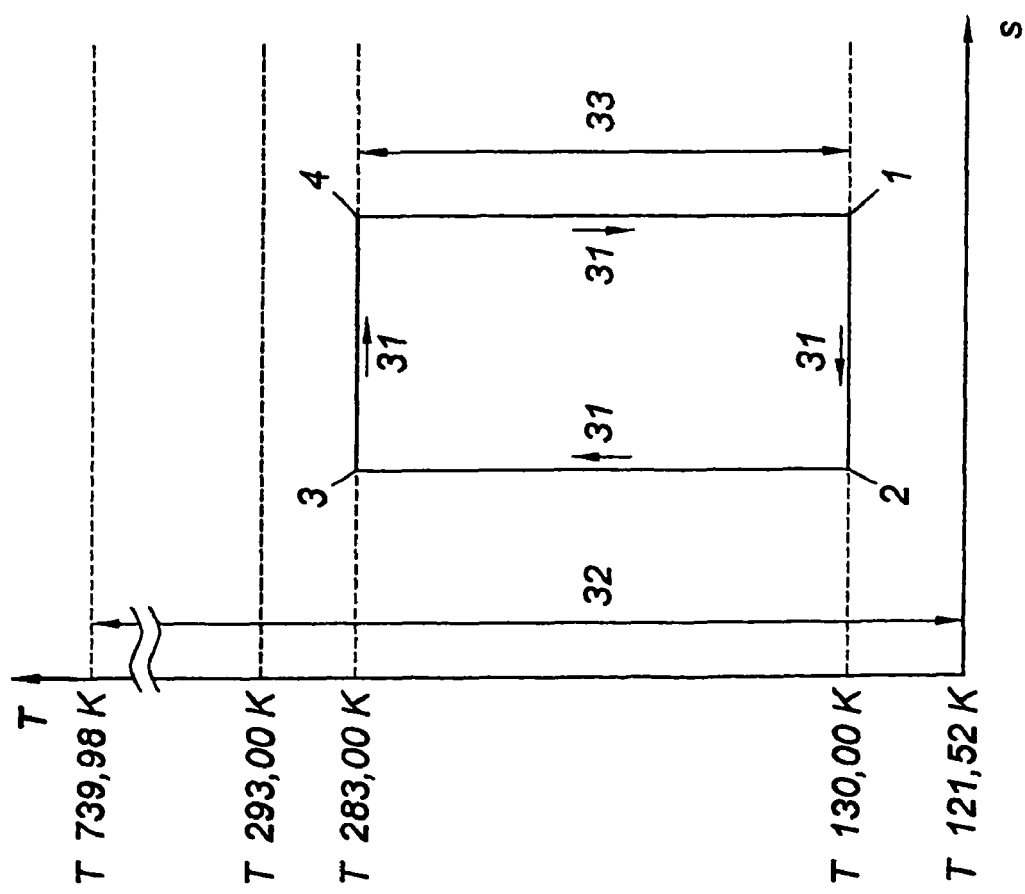
FIG. 5 shows a Ts-diagram explaining the cyclic process.

FIG. 5 shows an idealized T/s diagram, in which the temperature is entered over the entropy. The cyclic process is passed in the direction of the arrows 31. The double arrow 32 shows the temperature difference of the centrifuge, i.e. the rotor 13 over the gas chambers 17a, 17b, 17c, 17d. As a result of the losses in the heat transfer, the temperature difference 33 which can actually be used in the cyclic process is considerably lower. The states 1, 2, 3, 4 in the diagram correspond to the states in the analogously designated points in FIG. 1. It can be noted for example that in the case of a single-phase working medium the changes in state 1→2 and 3→4 are not precisely isothermal.

| | [K]<br>T | [kg/m³]<br>d | [MPa]<br>P | [kJ/kgK]<br>s | kJ/kg<br>u | kJ/kg<br>h |
|---|---|---|---|---|---|---|
| Point 1 | 130 | 15 | 0.54937258 | 5.44088686 | 92.1986033 | 128.823442 |
| Point 2 | 130 | 70 | 2.10257662 | 4.92707388 | 77.8876766 | 107.924486 |
| Point 3 | 283 | 316.5007 | 30.2486572 | 4.92707388 | 153.810311 | 249.382476 |
| Point 4 | 283 | 92.150807 | 7.66041346 | 5.44088686 | 192.911843 | 276.040941 |

The present invention allows realizing an apparatus and a cyclic process with efficiencies which substantially exceed those of conventional solutions.

I claim:

1. A method of converting heat into mechanical work, in a cyclic process comprising the following steps:
    compressing a working medium while giving off heat;
    subsequently bringing the working medium into thermal contact with an ambient environment through a first heat exchanger;
    expanding the working medium and thereby obtaining mechanical work;
    guiding the working medium through a second heat exchanger disposed inside a rapidly rotating rotor, the rotor including at least one substantially annular gas chamber surrounding the second heat exchanger; and
    radially dissipating heat away from the second heat exchanger, through the annular gas chamber and away from an exterior of the gas chamber.

2. The method according to claim 1, which comprises guiding the working medium through a compressor downstream of the rotor, in a working medium flow direction.

3. The method according to claim 1, wherein the working medium takes up ambient heat in the first heat exchanger.

4. The method according to claim 1, which comprises conducting the working medium through the rotor substantially in an axial direction thereof.

5. The method according to claim 1, wherein a temperature difference is built up in the rotor of at least 100 K.

6. The method according to claim 5, wherein a temperature difference is built up in the rotor of at least 300 K.

7. The method according to claim 6, wherein a temperature difference is built up in the rotor of at least 500 K.

8. The method according to claim 1, which comprises dissipating the heat via cooling ribs on an outside of the rotor.

9. The method according to claim 1, which comprises dissipating the heat through a third heat exchanger on an outside of the rotor.

10. An apparatus for converting heat into mechanical work, comprising:
    a device for compressing a working medium;
    a turbine configured to expand the working medium to obtain mechanical work, said turbine including a first heat exchanger configured to obtain the working medium from the device and to subsequently bring the working medium into thermal contact with an ambient environment; and
    a rotor having an axis defining an axial direction;
    said rotor including a second heat exchanger disposed therein;
    said second heat exchanger configured to conduct the working medium substantially in the axial direction, having a substantially ring-cylindrical configuration, and being outwardly bounded by a substantially cylindrical wall;
    said rotor including a substantially annular gas chamber divided, in a radial direction, into a plurality of ring-cylindrical partial chambers;

said annular gas chamber configured to radially conduct heat away from said second heat exchanger; and said second heat exchanger being surrounded by said annular gas chamber.

11. The apparatus according to claim 10, wherein said partial chambers are configured to receive mutually different gases.

12. The apparatus according to claim 11, which comprises a pressure control device communicating with said ring-cylindrical partial chambers for setting an internal pressure therein.

13. The apparatus according to claim 12, wherein said pressure control device is disposed in a region of said axis of said rotor.

14. The apparatus according to claim 10, which comprises cylindrical separating walls separating said ring-cylindrical partial chambers from one another.

15. The apparatus according to claim 10, wherein the working medium is fed in and discharged, respectively, through shafts of said rotor.

16. The apparatus according to claim 10, which comprises a housing with magnets disposed to hold said rotor in said housing by exerting an inwardly directed magnetic force on a circumference of said rotor.

17. The apparatus according to claim 10, wherein said gas chamber is subdivided in the radial direction into at least three ring-cylindrical partial chambers.

18. The apparatus according to claim 10, wherein said gas chamber is subdivided in the radial direction into at least four ring-cylindrical partial chambers.

19. The apparatus according to claim 10, wherein said first heat exchanger is configured to isothermally expand the working medium.

20. The method according to claim 1, which comprises isothermally expanding the working medium while performing the step of subsequently bringing the working medium into thermal contact with the ambient environment.

* * * * *